Nov. 22, 1966   G. H. STIEGLER, JR   3,287,674
PRESSURIZED WAVEGUIDE SHUT-OFF
Filed July 16, 1964                             2 Sheets-Sheet 1

INVENTOR.
G.H. STIEGLER, JR.
BY
ATTORNEY
AGENT

Nov. 22, 1966  G. H. STIEGLER, JR  3,287,674
PRESSURIZED WAVEGUIDE SHUT-OFF

Filed July 16, 1964  2 Sheets-Sheet 2

INVENTOR.
G.H. STIEGLER, JR.
BY
ATTORNEY
AGENT

United States Patent Office 3,287,674
Patented Nov. 22, 1966

3,287,674
PRESSURIZED WAVEGUIDE SHUT-OFF
George H. Stiegler, Jr., Ellicott City, Md., assignor, by mesne assignments, to the United States of America as represented by the Secretary of the Air Force
Filed July 16, 1964, Ser. No. 383,266
3 Claims. (Cl. 333—98)

In pressurized waveguide transmission line systems it is often desirable to be able to disconnect a piece of equipment from the system for maintenance or replacement while maintaining full pressure in the remainder of the system. This is particularly true where continuous operation of the system is necessary or where pressurization is accomplished with a gas other than air, usually expensive. Both of these situations may exist, for example, where two sources of high power R.F. energy feed a single antenna through a waveguide switch, with one source in use and the other in standby. The switch isolates the standby source electrically but does not seal off the system pressure. When repair or replacement of one of the sources becomes necessary the problem of maintaining pressure in the system arises. Pressure windows will perform this function up to certain levels of pressure and R.F. power; but are unsuitable at very high pressure and power levels.

It is accordingly the object of this invention to provide apparatus to enable a piece of equipment to be disconnected from a pressurized transmission line system without loss of pressure in the system. Briefly, this is accomplished by providing a gas tight enclosure having two external oppositely disposed and axially aligned waveguide joints. One of these is for permanent connection to the pressurized waveguide system and the other for connection to the piece of equipment which it may be desired to remove or depressurize for other reasons. Sections of waveguide extend from these joints to the interior of the gas tight enclosure with a gap provided between the ends of the aligned waveguides in the enclosure. A sliding member, externally actuated, is provided inside the enclosure and in the gap between the opposite waveguide ends. The sliding member, which moves transversely of the waveguides, has two operating positions "open" and "closed." In the "open" position the sliding member provides a short section of waveguide bridging the gap between the internal ends of the waveguides leading from the external joints thus providing a straight feed through the enclosure, the discontinuities at the junctions being reduced to a minimum by suitable choke joints. In the "closed" position of the sliding member, the bridging waveguide is removed from the gap and a sealing plate having a suitable gasket is brought opposite the internal end of the waveguide leading to the equipment to be depressurized. When the equipment is depressurized the pressure within the enclosure forces the sealing plate into gas tight contact with the waveguide end, thus preventing loss of system pressure. When the pressure has been restored, the pressures on both sides of the sealing plate are equalized and the sliding member may be returned to its "open" position.

The invention will be described in more detail with reference to the specific embodiment thereof shown in the accompanying drawings in which.

Figure 1:
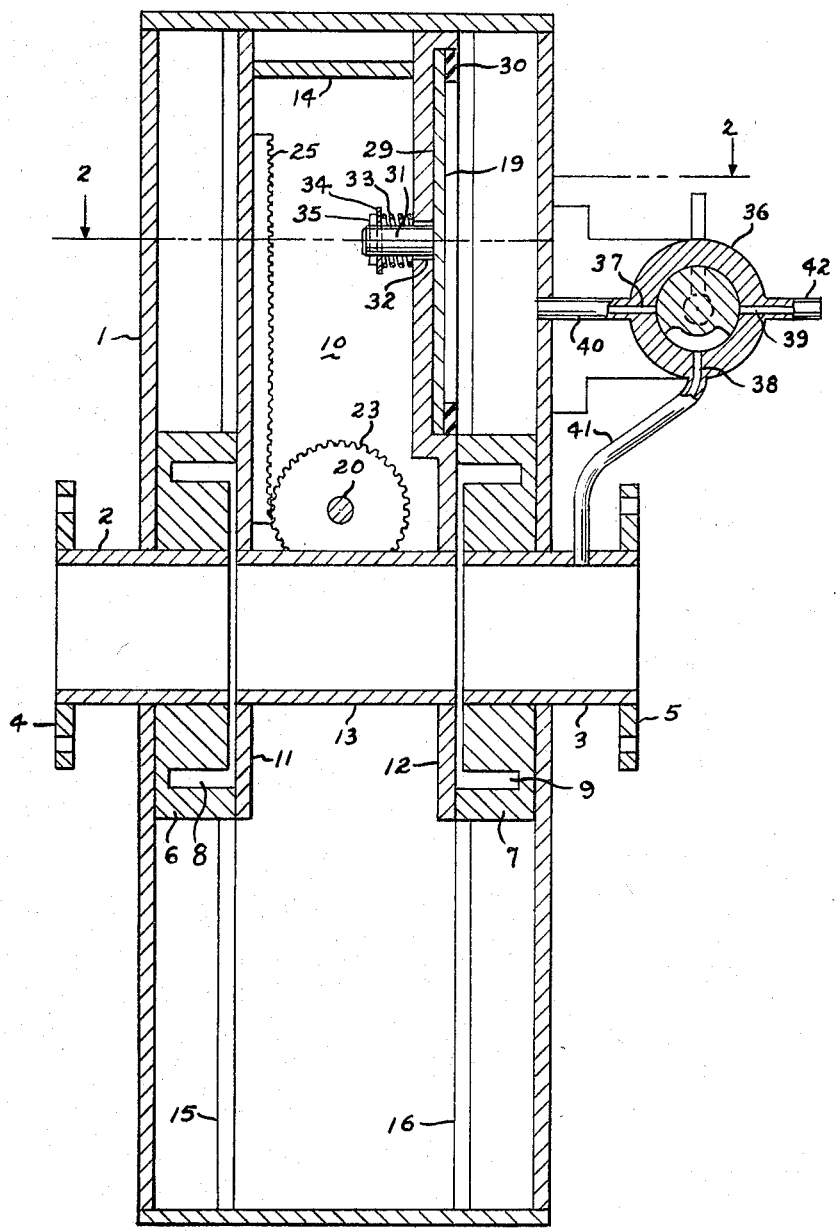
FIG. 1 is a sectional view of the waveguide shut-off taken along line 1—1 in FIG. 2.
Figure 2:
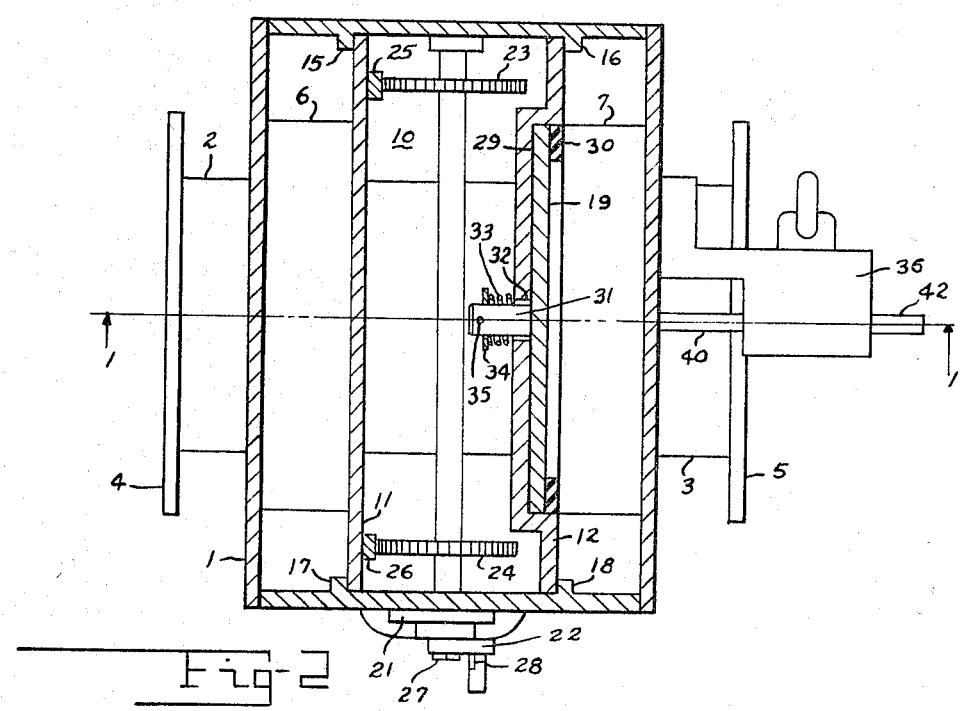
FIG. 2 is a sectional view taken along line 2—2 in FIG. 1.
Figure 3:
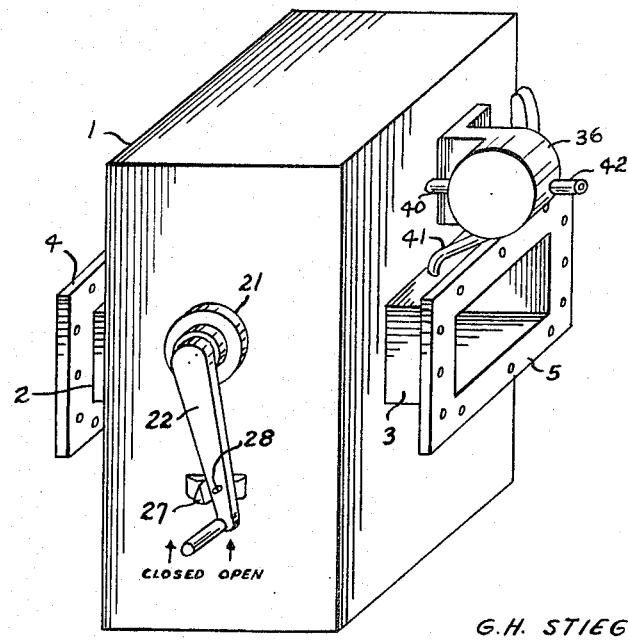
FIG. 3 shows the external appearance of the waveguide shut-off.

Referring to FIGS. 1–3, the apparatus comprises a main body 1 in the form of a rectangular gas tight enclosure. Short axially aligned rectangular waveguide sections 2 and 3 extend from the inside of enclosure 1 through opposite faces and terminates in suitable waveguide couplings flanges 4 and 5. The inner ends of waveguides 2 and 3 are surrounded by metallic members 6 and 7 having continuous circular grooves 8 and 9 forming parts of continuous circular groove choke couplings to be described later. The thickness of members 6 and 7 outside grooves 8 and 9 is somewhat greater than the thickness inside the grooves as seen in FIG. 1.

A sliding member, generally indicated by reference numeral 10, is made up of two plates 11 and 12 held together by a rectangular waveguide section 13 and a spacing member 14 extending therebetween. The waveguide section 13 is of the same internal height and width as waveguide sections 2 and 3. Guides 15, 16, 17 and 18, the inner surfaces of which are in the same planes as the surfaces of members 6 and 7 external to the grooves 8 and 9, provide channels in which member 10 may be slid from an upper or "open" position (shown), in which waveguide section 13 is in alignment with waveguide sections 2 and 3, to a lower or "closed" position, in which disc 19, to be explained later, is centered on the axis of waveguide sections 2 and 3. Member 10 is made to have an easy sliding fit between the guides and between the surfaces of members 6 and 7 external to their circular grooves. Shaft 20, which passes through a gas tight bushing 21 to crank 22 external of enclosure 1, carries pinions 23 and 24 which engage racks 25 and 26 attached to plate 11 for moving member 10 between its upper and lower positions. The sizes of pinions 23 and 24 is made such that the complete movement is accomplished in slightly less than one complete revolution of crank 22. Crank 22 is provided with a stop 27, and there may be provided a detent or locking pin 28 for holding the crank in either its "open" or "closed" position.

Plate 12 of sliding member 10 is provided with a circular recess 29 for receiving disc 19 and gasket 30 attached to disc 19 at its edge. Stud 31 is attached to disc 19 and passes loosely through a hole 32 at the center of recess 29. Stud 31 and spring 33, retained by washer 34 and pin 35, serve to normally bias disc 19 to the bottom of recess 29. The depth of recess 29 and the thickness of disc 19 and gasket 30 are made such that the surface of gasket 30 is normally flush with or only slightly below the surface of plate 12 so that the gasket does not interfere with the downward movement of the sliding member 10. The inner diameter of gasket 30 is made substantially equal to the outer diameter of groove 9, the diameter of disc 19 exceeding this by an amount sufficient to provide enough gasket surface for a satisfactory seal against member 7 when element 10 is in its lower or "closed" position.

Valve 36 has three positions and three ports 37, 38 and 39 (FIG. 1). In the center position of the valve (shown) all ports are closed off. In its clockwise position (as seen in FIG. 1) ports 37 and 38 are connected together, and in its counterclockwise position ports 38 and 39 are connected together. Port 37 is connected to the interior of enclosure 1 through tube 40, port 38 is connected to the interior of waveguide 3 through tube 41 and port 39 is connected to the atmosphere through tube 42. The purpose of valve 36 will appear later.

In its usual application, the above described waveguide shut-off is connected between the pressurized waveguide system and the component that it may be necessary to depressurize from time to time for maintenance or replacement. The component is coupled to the shut-off at flange 5, while the pressurized waveguide system is coupled at flange 4. In normal operation, valve 36 is in its central position, as shown in FIG. 1, and sliding element 10 is in its upper or "open" position, as shown. In this position there is a direct waveguide coupling between flanges 4 and 5 via waveguide sections 2, 3 and 13. The discontinuity at the junctions between waveguide section 13 and waveguide sections 2 and 3 is reduced to a minimum by the choke couplings made up of elements 6 and 7 with their continuous circular grooves 8 and 9 in cooperation with plates 11 and 12 of the element 10. Continuous circular groove choke couplings of this type are well known in the art and described in the literature, for example, in Microwave Transmission Circuits—Ragan, Radiation Laboratory Series Vol. 9, McGraw-Hill, page 111. Because of the gas tight construction of enclosure 1 and the closed position of valve 36 the system and connected component remain fully pressurized.

When it is desired to depressurize the component connected to flange 5, crank 22 (FIG. 3) is rotated counterclockwise to its "closed" position which lowers element 10 (FIG. 1) to its lower or "closed" position. In this position disc 19 is centered on the axis of waveguide section 3. Valve 36 is next rotated to its counterclockwise position (as seen in FIG. 1) allowing the pressurized gas in waveguide section 3 and in the apparatus connected thereto to escape to the atmosphere through tubes 41 and 42. The fall in pressure in waveguide section 3 causes disc 19 to be forced toward element 7 and form a gas tight seal over the waveguide 3 opening through the agency of gasket 30. Since port 37 is now closed, the gas pressure in the remainder of the system is maintained.

When it is desired to again pressurize waveguide section 3 and the apparatus connected thereto, valve 36 is rotated to its clockwise position (as seen in FIG. 1) allowing pressurized gas to flow from enclosure 1 into waveguide section 3 through tubes 40 and 41. When the pressures on the two sides of disc 19 have become equalized, element 10 may be returned to its upper or "open" position by rotating crank 22 (FIG. 3) clockwise back to its open position.

I claim:

1. A pressurized waveguide shut-off comprising: a gas tight enclosure; similar first and second short sections of open ended waveguide extending from the inside of said enclosure to the outside, the inner ends of said waveguide sections being spaced apart; means for coupling the outer end of said first waveguide section to a pressurized waveguide system, and means for coupling the outer end of said second waveguide section to a component which it may be desired to disconnect from said pressurized system; a member contained in said enclosure and selectively movable between "open" and "closed" positions by means external to said enclosure; said movable member having an open ended section of waveguide similar to said first and second waveguide sections which bridges the space between the inner ends of said first and second waveguide sections when said movable member is in its "open" position; and said movable member also having a cover plate and gasket assembly which is positioned opposite the inner end of said second waveguide section when said movable member is in its "closed" position, said plate being yieldably held by said movable member so as to be forceable into gas tight closure of the inner end of said second waveguide section by the pressure in said enclosure when the pressure in said second waveguide section is reduced; and a three-position valve having three ports connected, respectively, to said enclosure, said second waveguide section and the atmosphere, said valve operating in one position to close all ports, in another position to connect said second waveguide section to the atmosphere and to close the port connected to said enclosure for depressurizing said second waveguide section after said movable member has been moved from its "open" to its "closed" position, and in the remaining position to connect said second waveguide section to said enclosure for pressurizing said second waveguide from said enclosure before moving said movable member from its "closed" to its "open" position.

2. A pressurized waveguide shut-off comprising: a gas tight enclosure having a pair of oppositely disposed parallel walls; similar first and second short sections of open ended waveguide, said first section extending through one of said parallel walls and the second section extending through the other of said parallel walls in directions normal to said walls, said sections being in longitudinal alignment and having their ends inside said enclosure spaced apart; means for coupling the outer end of said first waveguide section to a pressurized waveguide system, and means for coupling the outer end of said second waveguide section to a component which it may be desired to disconnect from said pressurized system; a member contained in said enclosure and movable between "open" and "closed" positions in a direction transverse to said first and second waveguide sections in the space between their inner ends; said movable member having an open ended section of waveguide similar to said first and second waveguide sections which bridges the space between the inner ends of said first and second waveguide sections when said movable member is in its "open" position; said movable member also having a cover plate and gasket assembly which is positioned opposite the inner end of said second waveguide section when said movable member is in its "closed" position, said plate being yieldably held by said movable member so as to be forceable into gas tight closure of the open end of said second waveguide section by the pressure in said enclosure when the pressure in said second waveguide section is reduced; a three-position valve having three ports connected, respectively, to said enclosure, said second waveguide section and the atmosphere, said valve operating in one position to close all ports, in another position to connect said second waveguide section to the atmosphere with the enclosure port closed, and in the remaining position to connect said second waveguide section to said enclosure; and means coupled to said movable member and extending outside said enclosure for selectively actuating said member to its "open" and "closed" positions.

3. A pressurized waveguide shut-off comprising: a gas tight enclosure having a pair of oppositely disposed parallel walls; similar first and second short sections of open ended waveguide, said first section extending through one of said parallel walls and the second section extending through the other of said parallel walls in directions normal to said walls, said sections being in longitudinal alignment and having their ends inside said enclosure spaced apart; means for coupling the outer end of said first waveguide section to a pressurized waveguide system, and means for coupling the outer end of said second waveguide section to a component which it may be desired to disconnect from said pressurized system; a member contained in said enclosure and movable between "open" and "closed" positions in a direction transverse to said first and second waveguide sections in the space between their inner ends; said movable member having means providing a pair of parallel flat conductive surfaces normal to the longitudinal axes of said first and second waveguide sections and separated by a distance slightly less than the space between the inner ends of said first and second sections; a bridging section of waveguide similar to said first and second waveguide sections extending between said parallel surfaces in a direction normal thereto and in alignment with said first and second sections when said movable member is in its "open" position, and means attached to and surrounding the inner ends of said first and second waveguide sections and cooperating with said conductive surfaces when said movable member is in its "open" position to form continuous circular groove choke couplings at the junctions of said bridging waveguide section with said first and second waveguide sections; said movable member also having a cover plate and gasket assembly which is positioned opposite the inner end of said second waveguide section when said movable member is in its "closed" position, said plate being yieldably held by said movable member so as to be forceable into gas tight closure of the open end of said second waveguide section by the pressure in said enclosure when the pressure in said second waveguide section is reduced; a three-position valve having three ports connected, respectively, to said enclosure, said second waveguide section and the atmosphere, said valve operating in one position to close all ports, in another position to connect said second waveguide section to the atmosphere with the enclosure port closed, and in the remaining position to connect said second waveguide section to said enclosure; and means coupled to said movable member and extending outside said enclosure for selectively actuating said member to its "open" and "closed" positions.

References Cited by the Examiner

UNITED STATES PATENTS 2,001,214  5/1935  Pelzer _____ 317—625.22
3,212,036  10/1965  Skarpaas _____ 333—98

References Cited by the Applicant

UNITED STATES PATENTS 3,089,511  5/1963  Taylor.

ELI LIEBERMAN, *Primary Examiner.*

L. ALLAHUT, *Assistant Examiner.*